United States Patent
Yu

(10) Patent No.: US 11,140,332 B2
(45) Date of Patent: Oct. 5, 2021

(54) IMAGING CONTROL METHOD, IMAGING DEVICE AND UNMANNED AERIAL VEHICLE

(71) Applicant: SZ DJI TECHNOLOGY CO., LTD., Shenzhen (CN)

(72) Inventor: Lifu Yu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/731,992

(22) Filed: Dec. 31, 2019

(65) Prior Publication Data

US 2020/0154026 A1  May 14, 2020

Related U.S. Application Data

(63) Continuation of application No. PCT/CN2017/107156, filed on Oct. 20, 2017.

(51) Int. Cl.
*H04N 5/235* (2006.01)
*H04N 5/238* (2006.01)

(52) U.S. Cl.
CPC .......... *H04N 5/2353* (2013.01); *H04N 5/238* (2013.01); *H04N 5/2351* (2013.01)

(58) Field of Classification Search
CPC ..... H04N 5/2353; H04N 5/2351; H04N 5/238
See application file for complete search history.

(56) References Cited

U.S. PATENT DOCUMENTS

| 5,519,466 A * | 5/1996 | Arai .................. G02B 7/32 396/106 |
| 2017/0054921 A1* | 2/2017 | Lu ..................... G06T 5/002 |
| 2018/0046187 A1* | 2/2018 | Martirosyan .......... G05D 1/106 |

FOREIGN PATENT DOCUMENTS

| CN | 101868967 A | 10/2010 |
| CN | 102164247 A | 8/2011 |
| CN | 102739939 A | 10/2012 |
| CN | 103747188 A | 4/2014 |
| CN | 105242481 A | 1/2016 |
| CN | 105450936 A | 3/2016 |
| CN | 105611189 A | 5/2016 |
| CN | 106027914 A | 10/2016 |
| JP | 2000275695 A | 10/2000 |
| JP | 2000307923 A | 11/2000 |
| JP | 2016134703 A | 7/2016 |
| JP | 2016219899 A | 12/2016 |
| JP | 2017092876 A | 5/2017 |

OTHER PUBLICATIONS

The World Intellectual Property Organization (WIPO) International Search Report for PCT/CN2017/107156 dated Apr. 4, 2018 6 pages.

\* cited by examiner

*Primary Examiner* — Ahmed A Berhan

(74) *Attorney, Agent, or Firm* — Anova Law Group, PLLC

(57) ABSTRACT

Imaging control method, imaging device and unmanned aerial vehicle are provided. An imaging control method for an imaging device with a lens includes: acquiring a brightness value of an environment in which an object-to-be-imaged is located; determining, according to the brightness value, an aperture value and a shutter speed for the lens of the imaging device corresponding to the brightness value; and implementing, according to the determined aperture value and the determined shutter speed, an imaging process on the object-to-be-imaged by the imaging device.

15 Claims, 4 Drawing Sheets

IMAGING CONTROL METHOD, IMAGING DEVICE AND UNMANNED AERIAL VEHICLE

CROSS-REFERENCES TO RELATED APPLICATIONS

This application is a continuation application of International Application No. PCT/CN2017/107156, filed on Oct. 20, 2017, the entire contents of which are hereby incorporated by reference.

FIELD OF THE DISCLOSURE

The present disclosure generally relates to the field of imaging technology and, more particularly, relates to an imaging control method, an imaging device, and an unmanned aerial vehicle (UAV) thereof.

BACKGROUND

An imaging principle of current imaging devices (such as cameras) is that: light enters from the lens and is filtered and exposed (photoelectric conversion) by a charge-coupled device (CCD) to "decompose" an object being imaged into individual pixels one by one arranged in a certain format. The pixels are transferred to the "analog-to-digital converter" in the form of analog image signals, converted into digital signals, transmitted to the image processor, and processed into real images.

Due to differences in images formed by imaging objects in environments with different brightness, an amount of light entering an imaging device and a sensitivity of converting the amount of light into electrical signals are often adjusted by adjusting aperture, shutter, and sensitivity (ISO) of the imaging device, so that normally exposed images can be acquired in a variety of environments with significant differences in brightness.

Among the three parameters of aperture, shutter, and ISO, aperture has the worst continuous granularity. In general, for an imaging lens, the stop-distance between two adjacent stops of adjustment is usually one-third of the stop. If the exposure is adjusted by changing the aperture, because the amount of incoming light changes by up to one-third of the stop, before and after the adjustment, it will cause the screen brightness to change significantly, thereby affecting imaging quality.

In order to avoid excessive changes in screen brightness and ensure imaging quality, an imaging control method, an imaging device and a UAV thereof are provided in the present disclosure.

BRIEF SUMMARY OF THE DISCLOSURE

One aspect of the present disclosure provides an imaging method. The imaging method for an imaging device with a lens includes: acquiring a brightness value of an environment in which an object-to-be-imaged is located; determining, according to the brightness value, an aperture value and a shutter speed for the lens of the imaging device corresponding to the brightness value; and implementing, according to the determined aperture value and the determined shutter speed, an imaging process on the object-to-be-imaged.

Another aspect of the present disclosure provides an imaging device. The imagining device includes an environment sensor, for acquiring a brightness value of an environment in which an object-to-be-imaged is located; a processor for determining, according to the brightness value acquired by the environment sensor, an aperture value and a shutter speed corresponding to the brightness value, and controlling, according to the determined aperture value and shutter speed, the imaging lens to implement an imaging process on the object-to-be-imaged; and an imaging lens. The processor is communicatively connected with the environment sensor and the imaging lens.

Another aspect of the present disclosure provides a UAV. The UAV includes a rack, a gimbal, and an imaging device provided in the present disclosure. The gimbal is mounted on the rack and is used to carry the imaging device.

Other aspects or embodiments of the present disclosure can be understood by those skilled in the art in light of the description, the claims, and the drawings of the present disclosure.

BRIEF DESCRIPTION OF THE DRAWINGS

In order to more clearly explain the embodiments of the present disclosure, the drawings used in the description of the embodiments will be briefly introduced below. Obviously, these drawings are merely example, and those skilled in the art can derive other drawings based on these drawings without creative efforts.

DETAILED DESCRIPTION

In order to make the objectives, technical solutions, and advantages of the embodiments of the present disclosure clearer, the technical solutions in the embodiments of the present disclosure will be described below with reference to the accompanying drawings. Obviously, the described embodiments are part of the embodiments of the present disclosure, but not all the embodiments. Based on the embodiments of the present disclosure, other embodiments acquired by those skilled in the art without creative efforts shall fall within the protection scope of the present disclosure.

An imagining control method, an imaging device and a UAV are provided by embodiments of the present disclosure. The following description of the invention uses an UAV as an example of an aircraft. It will be apparent to those skilled in the art that other types of aircraft can be used without limitation. The embodiments of the present disclosure can be applied to various types of UAVs. For example, the UAV can be a small UAV. In some embodiments, the UAV may be a rotorcraft such as a multi-rotor aircraft propelled by multiple propulsion devices through air. The embodiments of the present disclosure are not limited thereto, and the UAV may also be another type of UAV or mobile device.

Figure 1:
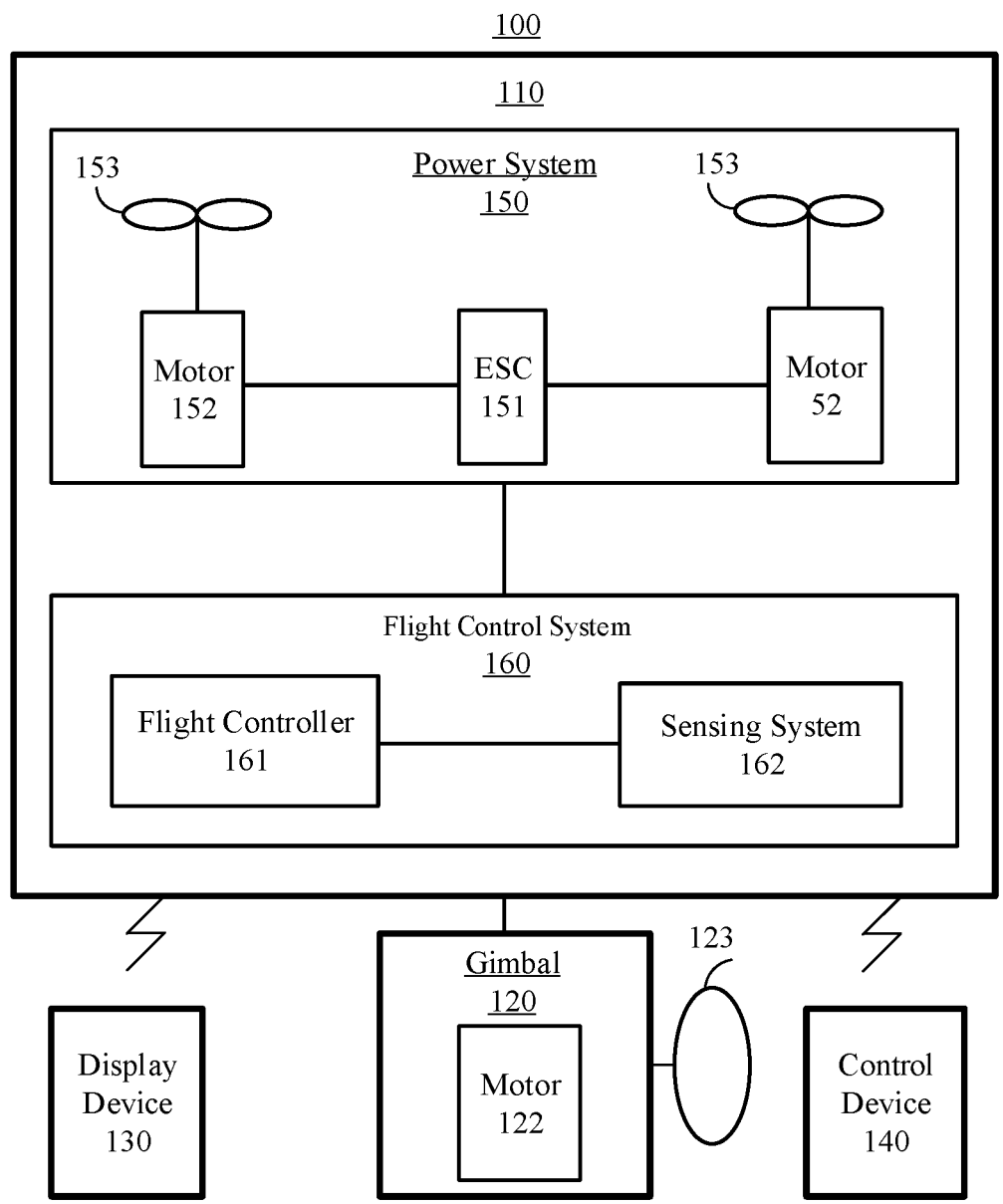
FIG. 1 illustrates a schematic diagram of an unmanned aerial system 100 consistent with various disclosed embodiments of the present disclosure.

FIG. 1 illustrates a schematic diagram of an unmanned aerial system 100 consistent with various disclosed embodiments of the present disclosure. One embodiment is described by using a rotary-wing UAV as an example.

The unmanned aerial system 100 may include an UAV 110, a gimbal 120, a display device 130, and a control device 140. The UAV 110 may include a power system 150, a flight control system 160, and a frame (not shown). The UAV 110 can communicate wirelessly with the control device 140 and the display device 130.

The frame can include a fuselage and an undercarriage (also called a landing gear). The fuselage may include a center frame and one or more arms connected to the center frame. One or more arms extend radially from the center frame. The undercarriage is connected to the fuselage and is used to support the UAV 110 when landing.

The power system 150 may include one or more electronic speed controllers (ESCs) 151, one or more propellers 153, and one or more electric motors 152 corresponding to the one or more propellers 153. The motor 152 is connected between the ESC 151 and the propeller 153. The motor 152 and the propeller 153 are disposed on an arm of the UAV 110. The ESC 151 is used to receive driving signals generated by the flight control system 160 and provide, according to the driving signal, driving currents to the motor 152 to control the rotation speed of the motor 152. The motor 152 is used to drive the propeller to rotate, so as to provide a power for the flight of the UAV 110. The power enables the UAV 110 to achieve one or more degrees of freedom of movement. In some embodiments, the UAV 110 may rotate about one or more rotation axes. For example, the rotation axis may include a roll axis, a yaw axis, and a pitch axis. The motor 152 may be a direct current (DC) motor or an alternate current (AC) motor. In addition, the motor 152 may be a brushless motor or a brushed motor.

The flight control system 160 may include a flight controller 161 and a sensing system 162. The sensing system 162 is used to measure the attitude information of the UAV, that is, the position information and status information of the UAV 110 in space, such as three-dimensional position, three-dimensional angle, three-dimensional velocity, three-dimensional acceleration, and three-dimensional angular velocity. The sensing system 162 may include at least one of a gyroscope, an ultrasonic sensor, an electronic compass, an inertial measurement unit (IMU), a vision sensor, a global navigation satellite system, and a barometer. For example, the global navigation satellite system may be a global positioning system (GPS). The flight controller 161 is used to control the flight of the UAV 110. For example, according to the attitude information measured by the sensing system 162, the flight controller 161 can control the flight of the UAE 110. The flight controller 161 can control the UAV 110 according to a pre-programmed program instruction and can also control the UAV 110 by responding to one or more control instructions from the control device 140.

The gimbal 120 may include a motor 122. The gimbal is used to carry the imaging device 123. The flight controller 161 can control the movement of gimbal 120 through the motor 122. Optionally, in another embodiment, the gimbal 120 may further include a controller for controlling the movement of the gimbal 120 by controlling the motor 122. The gimbal 120 may be independent of the UAV 110 or may be part of the UAV 110. The motor 122 may be a DC motor or an AC motor. In addition, the motor 122 may be a brushless motor or a brush motor. The gimbal can be located on the top of the UAV or at the bottom of the UAV.

The imaging device 123 may be a device for capturing images, such as a camera or a video camera. The imaging device 123 may communicate with a flight controller and perform shooting under the control of the flight controller. In one embodiment, the imaging device 123 includes at least a photosensitive element, such as a complementary metal oxide semiconductor (CMOS) sensor or a charge-coupled device (CCD) sensor.

The display device 130 is located on the ground side of the unmanned aerial system 100, can communicate with the UAV 110 wirelessly, and can be used to display the attitude information of the UAV 110. In addition, an image captured by the imaging device may also be displayed on the display device 130. The display device 130 may be an independent device or may be integrated in the control device 140.

The control device 140 is located on the ground side of the unmanned flight system 100 and can communicate with the UAE 110 wirelessly for remote control of the UAV 110.

The above naming of the components of the unmanned aerial system is for identification purposes only and should not be construed as limiting the embodiments of the present disclosure.

Figure 2:
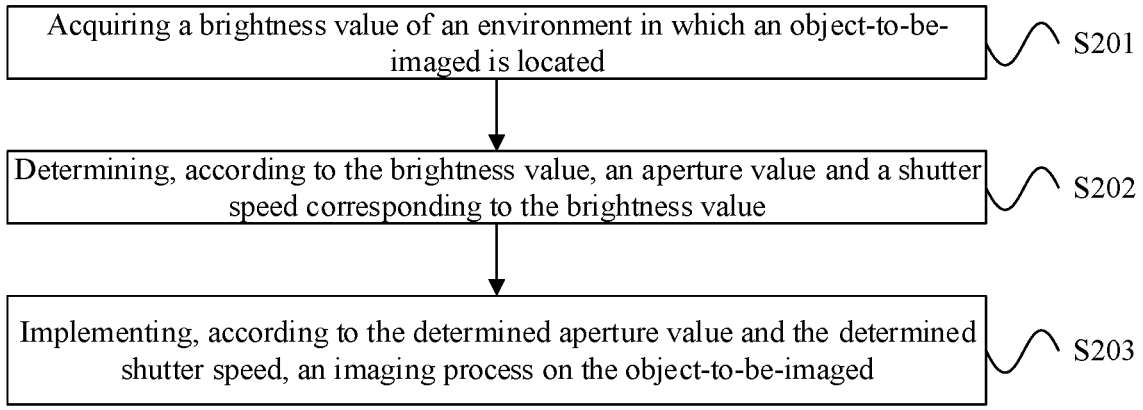
FIG. 2 illustrates a flow chart of an exemplary imaging control method consistent with various disclosed embodiments of the present disclosure.

FIG. 2 illustrates a flow chart of an exemplary imaging control method consistent with various disclosed embodiments of the present disclosure. As shown in FIG. 2, the method in one embodiment may include the followings.

S201: acquiring a brightness value of an environment in which an object-to-be-imaged is located.

S202: determining, according to the brightness value, an aperture value and a shutter speed corresponding to the brightness value.

S203: implementing, according to the determined aperture value and the determined shutter speed, an imaging process on the object-to-be-imaged.

In one embodiment, an object-to-be-imaged may also be referred to as a to-be-photographed object. For example, the object-to-be-imaged may be a person who is stationary or in motion, or a vehicle that is stationary or in motion such as a car, an airplane, a train, a bicycle. The object-to-be-imaged can also be a building, a natural landscape, an item or the like. In the process of imaging the object-to-be-imaged, a brightness value of the environment in which the object-to-be-imaged is acquired. For example, the environment sensor can sense the brightness value of the environment. That is, the environment sensor can be used to detect the brightness value of the environment in which the object-to-be-imaged is located. The environment sensor may directly sense the environment brightness through a photosensitive element, such as a CMOS sensor or CCD sensor. The brightness of the environment can be sensed by pixel light sensing. If the light in the environment is stronger, the pixel value sensed by the light sensor is higher. If the light in the environment is weaker, the pixel value sensed by the light sensor is lower. The brightness of the environment is different if the environment of the object-to-be-imaged is different. For example, the brightness of environment of the object-to-be-imaged at night is different from that at day. Even more, if the environment of the object-to-be-imaged is sunny, cloudy, or rainy, the brightness value of the environment of the object-to-be-imaged is different.

According to the acquired brightness value of the environment in which the object-to-be-imaged is located, an aperture value and a shutter speed corresponding to the brightness value are determined. The aperture value in one embodiment corresponds to the brightness value, and the shutter speed also corresponds to the brightness value.

In some embodiments, there is a correspondence between brightness value and aperture value, and a correspondence between brightness value and shutter speed. According to the acquired brightness value and the correspondence between brightness value and aperture value, an aperture value corresponding to the brightness value is determined. According to the acquired brightness value and the correspondence between brightness value and shutter speed, a shutter speed corresponding to the brightness value may also be determined.

In some embodiments, there is a correspondence among brightness value, aperture value, and shutter speed. According to the acquired brightness value and the correspondence among brightness value, aperture value, and shutter speed, the aperture value and the shutter speed corresponding to the brightness value are determined. The aperture value is not only related to the brightness value but also to the shutter speed. The shutter speed is not only related to the brightness value but also to the aperture value.

In some embodiments, a preset exposure table is stored. The exposure table may include a plurality of brightness values, and an aperture value and a shutter speed corresponding to each brightness value. The preset exposure table can be acquired through empirical values. For example, according to experiments, the aperture value and shutter speed under different brightness values are adjusted to implement various imaging processes. When the imaging effect is desired, aperture values and shutter speeds corresponding to different brightness values are recorded to form a preset exposure table. During operation, after a brightness value is acquired, the brightness value is searched in the preset exposure table. When a stored brightness value matching the acquired brightness value is found in the preset exposure table, an aperture value and a shutter speed corresponding to the matching brightness value are obtained from the preset exposure table.

In one embodiment, after an aperture value and a shutter speed corresponding to a brightness value are determined, according to the determined aperture value and shutter speed, an imaging process is implemented on the object-to-be-imaged. For example, if the determined aperture value is F2 and the shutter speed is 1/10 second, the imaging process is implemented on the object-to-be-imaged with the aperture of F2 and the shutter speed of 1/10 second.

In one embodiment, by acquiring a brightness value of an environment in which an object-to-be-imaged is located, according to the brightness value, the imaging control method determines an aperture value and a shutter speed corresponding to the brightness value. According to the determined aperture value and shutter speed, an imaging process on the object-to-be-imaged is implemented. According to the brightness value, a solution to automatically adjust the aperture value and shutter speed is implemented. Moreover, according to the brightness value, the aperture value and the shutter speed are adjusted simultaneously so that a defect that, if only the aperture value is adjusted, an image brightness acquired by an imaging process changes too much is avoided and the acquired image brightness matches the environment brightness. An image quality and a user experience are greatly improved.

Figure 3:
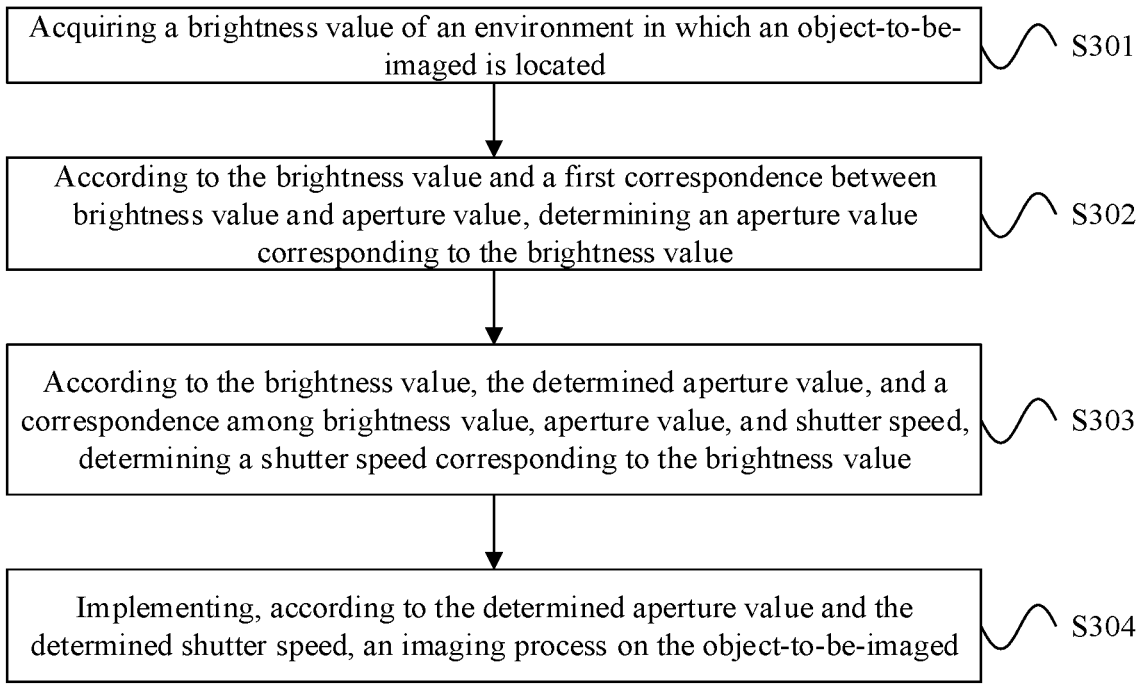
FIG. 3 illustrates a flow chart of another exemplary imaging control method consistent with various disclosed embodiments of the present disclosure.

FIG. 3 illustrates a flow chart of another exemplary imaging control method consistent with various disclosed embodiments of the present disclosure. As shown in FIG. 3, the method in one embodiment may include the following steps.

S301. acquiring a brightness value of an environment in which an object-to-be-imaged is located. For example, the specific implementation process of S301 can refer to the related descriptions associated with FIG. 2.

S302. according to the brightness value and a first correspondence between brightness value and aperture value, determining an aperture value corresponding to the brightness value.

S303. according to the brightness value, the determined aperture value, and a correspondence among brightness value, aperture value, and shutter speed, determining a shutter speed corresponding to the brightness value.

S304. implementing, according to the determined aperture value and the determined shutter speed, an imaging process on the object-to-be-imaged. The specific implementation process of S304 can refer to the related descriptions associated with FIG. 2.

In one embodiment, a correspondence exists between brightness value and aperture value, and the correspondence is called a first correspondence. After the brightness value is acquired, according to the first correspondence between brightness value and aperture value, the aperture value corresponding to the brightness value is determined. The first correspondence may also be acquired through empirical values. For example, the first correspondence may be a first preset table corresponding to different brightness values and empirical aperture values. By looking up the first preset table, the aperture value corresponding to the brightness value can be acquired.

In addition, in one embodiment, there is a correspondence among brightness value, aperture value, and shutter speed. That is, the shutter speed is related to both the brightness value and the aperture value. According to the acquired brightness value, the determined aperture value, and the correspondence among brightness value, aperture value, and shutter speed, the shutter speed is determined.

In some embodiments, the first correspondence includes correspondences between N different brightness value ranges and N different aperture values, where N is an integer greater than 1. That is, one aperture value corresponds to one brightness value range.

Accordingly, one way to implement the above S302 includes: when the brightness value is in an increasing trend compared with a previous brightness value, where the brightness value is a current brightness value and the previous brightness value is a brightness value at one moment of time or one time interval before a current time, if a difference between the brightness value and a maximum brightness value in one of brightness value ranges satisfies a first preset condition, the aperture value corresponding to the one of brightness value ranges is determined as the aperture value corresponding to the brightness value. If a difference between the brightness value and a maximum brightness value in any one of brightness value ranges does not satisfy the first preset condition, the aperture value corresponding to the brightness value range where the brightness value is located is determined as the aperture value corresponding to the brightness value. The first preset condition comprises: a difference between the brightness value and a maximum brightness value in a brightness value range is greater than or equal to 0 and less than or equal to the first preset value.

In one embodiment, a hysteresis range is set for the change of brightness values when an aperture value is selected. The magnitude of the hysteresis range equals to the first preset value. When the acquired brightness value is within one of brightness value ranges, the determined aperture value is the aperture value corresponding to the brightness value range. When the brightness value is in an increasing trend, the brightness value increases. If the brightness value is still within the brightness value range, the determined aperture value is the aperture value corresponding to the brightness value range. If the brightness value exceeds the brightness value range, whether a difference between the brightness value and a maximum brightness value of the brightness value range satisfies a first preset condition is determined. If the first preset condition is satisfied, the aperture value is still determined as the aperture value corresponding to the brightness value range. Although the brightness value increases and the aperture value does not change during the process, there is a correspondence among brightness value, aperture value, and shutter speed. The shutter speed changes during this process. If the first preset condition is not satisfied, it means that the brightness value has exceeded the hysteresis range, and the aperture value is determined to be the aperture value corresponding to the brightness value range in which the brightness value is located.

When the brightness value is in a decreasing trend compared with the previous brightness value, if a difference between a minimum brightness value in one of brightness value ranges and the brightness value satisfies a second preset condition, the aperture value corresponding to the one of brightness value ranges is determined as the aperture value corresponding to the brightness value. If a difference between a minimum brightness value in any one of brightness value ranges and the brightness value does not satisfy the second preset condition, the aperture value corresponding to the brightness value range where the brightness value is located is determined as the aperture value corresponding to the brightness value. The second preset condition comprises: a difference between a minimum brightness value in a brightness value range and the brightness value is greater than or equal to 0 and less than or equal to the second preset value.

In one embodiment, a hysteresis range is set for the change of brightness values when an aperture value is selected. The magnitude of the hysteresis range equals to the second preset value. When the acquired brightness value is within one of brightness value ranges, the determined aperture value is the aperture value corresponding to the brightness value range. When the brightness value is in a decreasing trend, the brightness value decreases and is still within the brightness value range, the determined aperture value is the aperture value corresponding to the brightness value range. If the brightness value falls outside the brightness value range, whether a difference between a maximum brightness value of the brightness value range and the brightness value satisfies a second preset condition is determined. If the second preset condition is satisfied, it is still determined that the aperture value is the aperture value corresponding to the brightness value range. Although the brightness value decreases and the aperture value does not change during the process, there is a correspondence among brightness value, aperture value, and shutter speed. Therefore, the shutter speed changes during this process. If the second preset condition is not satisfied, it means that the brightness value has fallen outside the hysteresis range, and the aperture value is determined to be the aperture value corresponding to the brightness value range in which the brightness value is located.

In some embodiments, the first preset value and the second preset value are both smaller than a difference between a maximum brightness value and a minimum brightness value in any one of brightness value ranges, so as to prevent the hysteresis range described above from exceeding the range of a brightness value range, and avoids the phenomenon that the aperture value jumps too much.

In some embodiments, the first preset value and the second preset value may be the same.

In some embodiments, two adjacent brightness value ranges are continuous. In the two adjacent brightness value ranges, the maximum brightness value of one brightness value range is the same as the minimum brightness value of the other brightness value range.

When the brightness value is at a boundary point between the two aperture values, due to certain errors, the aperture value often changes back and forth, which causes the problem of the brightness fluctuation of the screen. In one embodiment, by setting a hysteresis range, the above phenomenon is avoided to ensure that the brightness of the screen is uniform and no transitions occur.

In some embodiments, the correspondence among brightness value, aperture value, and shutter speed includes brightness value, aperture value, and shutter speed satisfy the following formulas:

$$\text{UseAv} = 256 * \log 2(\text{power}(\text{Fnum}, 2)) \quad (1)$$

$$\text{UseTv} = 256 * \log 2(1/\text{Shutter}) \quad (2)$$

$$\text{UseEv} = \text{UseAv} + \text{UseTv} \quad (3)$$

Fnum represents aperture value. Shutter represents shutter speed. UseAv represents relative aperture value. UseTv represents relative shutter speed. UseEv represents brightness value.

The correspondence among brightness value, aperture value, and shutter speed is expressed by the above formula (1), formula (2), and formula (3). Moreover, the aperture value and the shutter speed are associated with the brightness value through an "add" operation, which simplifies the intermediate calculation process. In addition, the brightness value equals to the sum of the relative aperture value and the relative shutter speed. The relationship among brightness value, aperture value, and shutter speed is represented by the relative aperture value and the relative shutter speed. Even if the lens is changed, without any changes of the above formulas, the correspondence among brightness value, aperture value and shutter speed under any lens can be represented by the above formulas.

Specifically, if the aperture value is assumed to have four levels: F2, F2.8, F4, and F5.6 and the corresponding UseAvs are 512, 768, 1024, and 1280, respectively. If the shutter speed ranges from 1/30s to 1/8000s, the corresponding UseTv ranges from 1256 to 3326 and the value of UseEv is 1768~4606.

Figure 4:
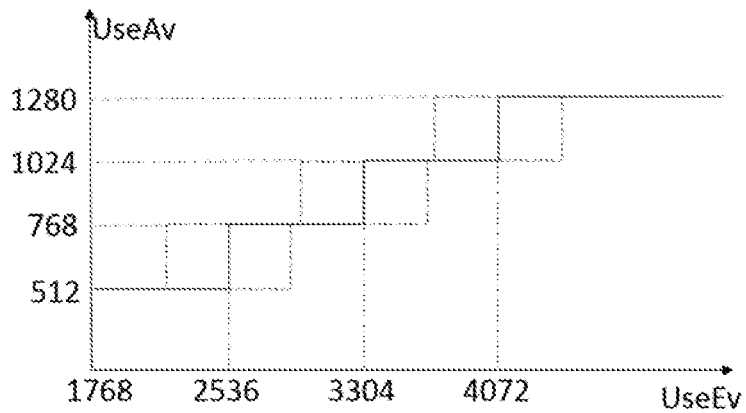
FIG. 4 illustrates a schematic diagram of an exemplary first correspondence between aperture value and brightness value consistent with various disclosed embodiments of the present disclosure.

A first correspondence between aperture value and brightness value is shown in FIG. 4. When the environment brightness is relatively dark, in order to ensure normal screen brightness, the maximum aperture value level needs to be selected as F2 and the longest shutter speed is 1/30 second. The corresponding UseAv is 512 and the corresponding UseEv is 1768. When the environment brightness gradually increases, the shutter value is changed first. When UseEv is increased to the theoretical change point of the aperture value, that is, when UseEv reaches 2536, in order to prevent the aperture value from changing back and forth between two levels, a 256 hysteresis range is added. In other words, when UseEv continues to increase until it reaches 2792, the aperture is changed from F2 to F2.8. When the environment brightness continues to increase, changes in subsequent sections are the same. Conversely, as the environment brightness decreases, in order to ensure normal screen brightness, the aperture value and shutter speed need to be changed. UseAv, UseTv, and UseEv become smaller accordingly. For example, when UseEv continues to decrease up to 2536, the theoretical change point of the aperture value is reached. In theory, the aperture value should be changed. However, in order to prevent the aperture from jumping back and forth, a 256 hysteresis range is also added. That is, only the UseEv continues to decrease to 2280, at which point the aperture value is changed from F2.8 to F2.

Accordingly, when the UseEv equals to 2536 (and 3304 and 4072 as shown in FIG. 4), a hysteresis protection is implemented on the aperture. Without the above hysteresis space, as long as UseEv is slightly increased, the aperture will change from F2 to F2.8; as long as UseEv is slightly decreased, the aperture will change from F2.8 to F2. In actual use, the UseEv often changes in a small range, which causes the aperture to change back and forth between F2 and F2.8.

In addition, for the change of the aperture, if the aperture is assumed to be changed from F2 to F2.8, UseAv jumps from 512 to 768. But the actual UseEv value that needs to be increased may only be 64. In order to ensure that the screen brightness does not change, the UseTv needs to be reduced by 192, so that the change amount of UseEv is only 64, thereby ensuring that the change in screen brightness is uniform without transitions.

According to the present disclosure, the imaging control method provided in one embodiment implements a solution for automatically adjusting the aperture value and the shutter speed according to the brightness value. According to the brightness value, both the aperture value and the shutter speed are adjusted. The problem that the brightness of the screen acquired by the imaging process is too large due to the only adjustment of the aperture value is avoided. The acquired screen brightness matches the environment brightness and ensure the uniform change of the screen brightness without transitions, thereby improving image quality and user experience.

Figure 5:
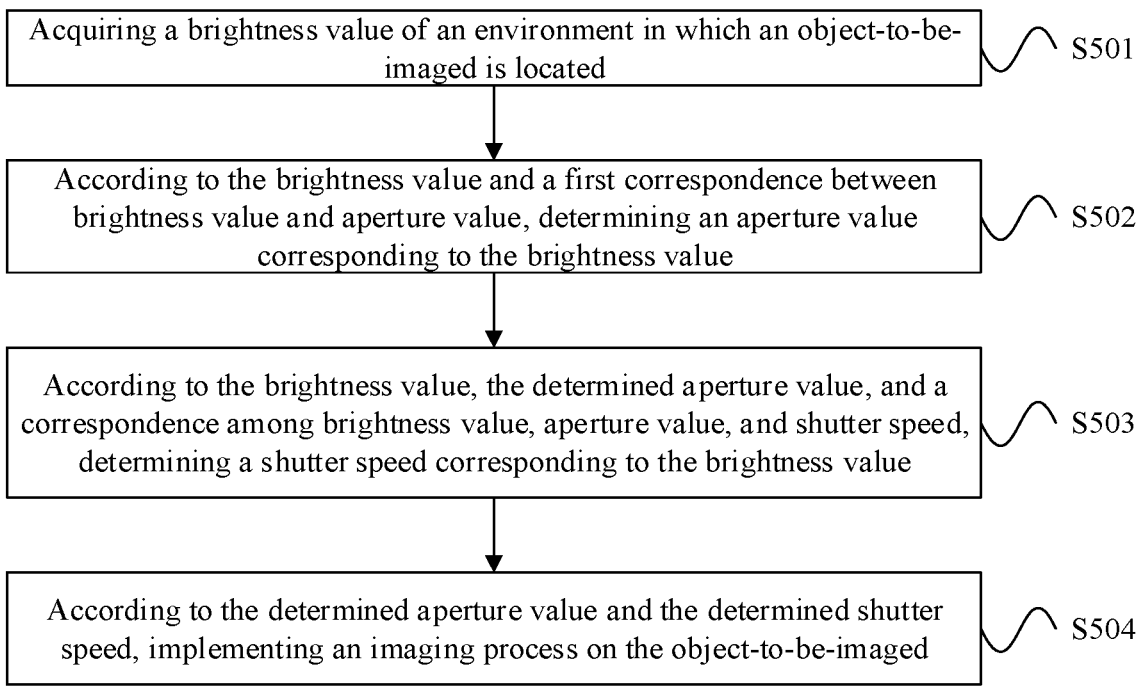
FIG. 5 illustrates a flow chart of another exemplary imaging control method consistent with various disclosed embodiments of the present disclosure.

FIG. 5 illustrates a flow chart of yet another exemplary imaging control method consistent with various disclosed embodiments of the present disclosure. As shown in FIG. 5, the method in one embodiment may include the following steps.

S501: acquiring a brightness value of an environment in which an object-to-be-imaged is located.

S502: according to the brightness value and a first correspondence between brightness value and aperture value, determining an aperture value corresponding to the brightness value.

S503: according to the brightness value, the determined aperture value, and a correspondence among brightness value, aperture value, and shutter speed, determining a shutter speed corresponding to the brightness value.

S504: according to the determined aperture value and the determined shutter speed, implementing an imaging process on the object-to-be-imaged.

In one embodiment, the specific implementation processes of S501 and S504 can refer to the related description associated with FIG. 2.

In one embodiment, a correspondence exists between a brightness value and a shutter speed is called a second correspondence. After the brightness value is acquired, according to the second correspondence between brightness value and shutter speed, the shutter speed corresponding to the brightness value is determined. The second correspondence may also be acquired through empirical values. For example, the second correspondence may be a second preset table corresponding to different brightness values and empirical shutter speeds. By looking up the second preset table, the shutter speed corresponding to the brightness value can be acquired.

In addition, in one embodiment, there is a correspondence among brightness value, aperture value, and shutter speed. That is, the aperture value is related to both the brightness value and the shutter speed. The aperture value is determined according to the acquired brightness value, the determined shutter speed, and the correspondence among brightness value, aperture value, and shutter speed.

In some embodiments, the second correspondence includes correspondences between M different brightness value ranges and M different shutter speeds, where M is an integer greater than 1. That is, one shutter speed corresponds to one brightness value range.

Accordingly, one way to implement the above S502 is: when the brightness value is in an increasing trend compared with a previous brightness value, where the brightness value is a current brightness value and the previous brightness value is a brightness value at one moment before a current time, if a difference between the brightness value and a maximum brightness value in one of brightness value ranges satisfies a third preset condition, the shutter speed corresponding to the one of brightness value ranges is determined as the shutter speed corresponding to the brightness value. If a difference between the brightness value and a maximum brightness value in any of brightness value ranges does not satisfy the third preset condition, the shutter speed corresponding to the brightness value range where the brightness value is located is determined as the shutter speed corresponding to the brightness value. The third preset condition comprises: a difference between the brightness value and a maximum brightness value in a brightness value range is greater than or equal to 0 and less than or equal to the third preset value.

In one embodiment, a hysteresis range is set for the change of brightness values when a shutter speed is selected. The magnitude of the hysteresis range equals to the third preset value. When the acquired brightness value is within one of brightness value ranges, the determined shutter speed is the aperture value corresponding to the brightness value range. When the brightness value is in an increasing trend, the brightness value increases. If the brightness value is still within the brightness value range, the determined shutter speed is the shutter speed corresponding to the brightness value range. If the brightness value exceeds the brightness value range, whether a difference between the brightness value and a maximum brightness value of the brightness value range satisfies a third preset condition is determined. If the third preset condition is satisfied, the shutter speed is still determined as the shutter speed corresponding to the brightness value range. Although the brightness value increases and the shutter speed does not change during the process, there is a correspondence among brightness value, aperture value, and shutter speed. The aperture value changes during this process. If the first preset condition is not satisfied, it means that the brightness value has exceeded the hysteresis range, and the shutter speed is determined to be the shutter speed corresponding to the brightness value range in which the brightness value is located.

When the brightness value is in a decreasing trend compared with the previous brightness value, if a difference between a minimum brightness value in one of brightness value ranges and the brightness value satisfies a fourth preset condition, the shutter speed corresponding to the one of brightness value ranges is determined as the shutter speed corresponding to the brightness value. If a difference between a minimum brightness value in any one of brightness value ranges and the brightness value does not satisfy the fourth preset condition, the shutter speed corresponding to the brightness value range where the brightness value is located is determined as the shutter speed corresponding to the brightness value. The fourth preset condition comprises: a difference between a minimum brightness value in a brightness value range and the brightness value is greater than or equal to 0 and less than or equal to the fourth preset value.

In one embodiment, a hysteresis range is set for the change of brightness values when a shutter speed is selected. The magnitude of the hysteresis range equals to the fourth preset value. When the acquired brightness value is within one of brightness value ranges, the determined shutter speed is the shutter speed corresponding to the brightness value range. When the brightness value is in a decreasing trend, the brightness value decreases. If the brightness value is still within the brightness value range, the determined shutter speed is the shutter speed corresponding to the brightness value range. If the brightness value falls outside the brightness value range, whether a difference between a maximum brightness value of the brightness value range and the brightness value satisfies a fourth preset condition is determined. If the fourth preset condition is satisfied, the shutter speed is still determined as the shutter speed corresponding to the brightness value range. Although the brightness value decreases and the shutter speed does not change during the process, there is a correspondence among brightness value, aperture value, and shutter speed. The aperture value changes during this process. If the second preset condition is not satisfied, it means that the brightness value has fallen outside the hysteresis range, and the shutter speed is determined to be the shutter speed corresponding to the brightness value range in which the brightness value is located.

In some embodiments, the third preset value and the fourth preset value are both smaller than a difference between a maximum brightness value and a minimum brightness value in any one of brightness value ranges, so as to prevent the hysteresis range described above from exceeding the range of a brightness value range, and avoids the phenomenon that the aperture value jumps too much.

In some embodiments, the third preset value and the fourth preset value may be the same.

In some embodiments, two adjacent brightness value ranges are continuous. In the two adjacent brightness value ranges, the maximum brightness value of one brightness value range is the same as the minimum brightness value of another brightness value range.

When the brightness value is at a boundary point between the two aperture values, due to certain errors, the aperture value often changes back and forth, which causes the problem of the brightness fluctuation of the screen. In one embodiment, by setting a hysteresis range, the above phenomenon is avoided to ensure that the brightness of the screen is uniform without transitions.

In some embodiments, the correspondence among brightness value, aperture value, and shutter speed includes: brightness value, aperture value, and shutter speed satisfy the following formulas:

$$UseAv = 256 * \log 2(power(Fnum, 2)) \quad (1)$$

$$UseTv = 256 * \log 2(1/Shutter) \quad (2)$$

$$UseEv = UseAv + UseTv \quad (3)$$

Fnum represents aperture value. Shutter represents shutter speed. UseAv represents relative aperture value. UseTv represents relative shutter speed. UseEv represents brightness value.

For descriptions of the above formula 1, formula 2 and formula 3, refer to the related descriptions in the above embodiments.

With the above solution, the imaging control method provided in one embodiment implements a solution for automatically adjusting the aperture value and the shutter speed according to the brightness value. According to the brightness value, both the aperture value and the shutter speed are adjusted. The problem that the brightness of the screen acquired by the imaging process is too large due to the only adjustment of the aperture value is avoided. The acquired screen brightness matches the environment brightness and ensure the uniform change of the screen brightness without transitions, thereby improving image quality and user experience.

Figure 6:
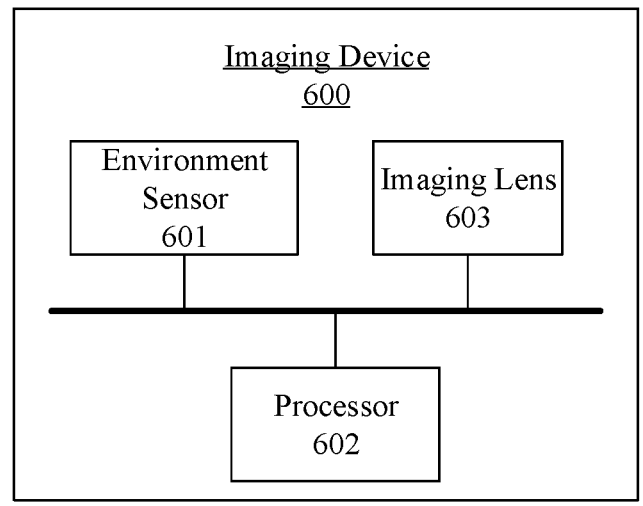
FIG. 6 illustrates a schematic diagram of an imaging device consistent with various disclosed embodiments of the present disclosure.

FIG. 6 illustrates a schematic diagram of an imaging device consistent with various disclosed embodiments of the present disclosure.

As shown in FIG. 6, the imaging device 600 in one embodiment may include an environment sensor 601, a processor 602, and an imaging lens 603. The processor 602 is communicatively connected with the environment sensor 601 and the imaging lens 603.

The environment sensor 601, is used to acquire a brightness value of an environment in which an object-to-be-imaged is located.

The processor 602, according to the brightness value acquired by the environment sensor 601, is used to determine an aperture value and a shutter speed corresponding to the brightness value. According to the determined aperture value and shutter speed, the processor 602 controls the imaging lens 603 to implement an imaging process on the object-to-be-imaged.

The environmental sensor 601 may be a photosensitive element such as a CMOS sensor or a CCD sensor.

In some embodiments, the processor 602 is specifically used to determine the aperture value and the shutter speed corresponding to the brightness value according to the brightness value and a correspondence among brightness value, aperture value, and shutter speed.

In some embodiments, the processor 602 is specifically used to: determine the aperture value corresponding to the brightness value according to the brightness value and a first correspondence between brightness value and aperture value; and determine the shutter speed according to the brightness value, the determined aperture value and the correspondence among brightness value, aperture value, and shutter speed.

In some embodiments, the first correspondence includes correspondences between N different brightness value ranges and N different aperture values, where N is an integer greater than 1.

The processor 602 is specifically used to: when the brightness value is in an increasing trend compared with a previous brightness value, where the brightness value is a current brightness value and the previous brightness value is a brightness value at one moment before a current time, if a difference between the brightness value and a maximum brightness value in one of brightness value ranges satisfies a first preset condition, the aperture value corresponding to the one of brightness value ranges is determined as the aperture value corresponding to the brightness value. If a difference between the brightness value and a maximum brightness value in any one of brightness value ranges does not satisfy the first preset condition, the aperture value corresponding to the brightness value range where the brightness value is located is determined as the aperture value corresponding to the brightness value. The first preset condition comprises: a difference between the brightness value and a maximum brightness value in a brightness value range is greater than or equal to 0 and less than or equal to the first preset value.

When the brightness value is in a decreasing trend compared with the previous brightness value, if a difference between a minimum brightness value in one of brightness value ranges and the brightness value satisfies a second preset condition, the aperture value corresponding to the one of brightness value ranges is determined as the aperture value corresponding to the brightness value. If a difference between a minimum brightness value in any one of brightness value ranges and the brightness value does not satisfy the second preset condition, the aperture value corresponding to the brightness value range where the brightness value is located is determined as the aperture value corresponding to the brightness value. The second preset condition comprises: a difference between a minimum brightness value in a brightness value range and the brightness value is greater than or equal to 0 and less than or equal to the second preset value.

In some embodiments, the first preset value and the second preset value are both smaller than a difference between a maximum brightness value and a minimum brightness value in any one of brightness value ranges.

In some embodiments, the processor 602 is specifically used to: determine, according to the brightness value and a second correspondence between brightness value and shutter speed, the shutter speed corresponding to the brightness value; and determine, according to the brightness value, the determined shutter speed and the correspondence among brightness value, aperture value, and shutter speed, the aperture value.

In some embodiments, the first correspondence includes correspondences between M different brightness value ranges and M different shutter speed, where M is an integer greater than 1.

The processor 602 is specifically used to: when the brightness value is in an increasing trend compared with a previous brightness value, where the brightness value is a current brightness value and the previous brightness value is a brightness value at one moment before a current time, if a difference between the brightness value and a maximum brightness value in one of brightness value ranges satisfies a third preset condition, the shutter speed corresponding to the one of brightness value ranges is determined as the shutter speed corresponding to the brightness value. If a difference between the brightness value and a maximum brightness value in any one of brightness value ranges does not satisfy the third preset condition, the shutter speed corresponding to the brightness value range where the brightness value is located is determined as the shutter speed corresponding to the brightness value. The third preset condition comprises: a difference between the brightness value and a maximum brightness value in a brightness value range is greater than or equal to 0 and less than or equal to the third preset value.

When the brightness value is in a decreasing trend compared with the previous brightness value, if a difference between a minimum brightness value in one of brightness value ranges and the brightness value satisfies a fourth preset condition, the shutter speed corresponding to the one of brightness value ranges is determined as the shutter speed corresponding to the brightness value. If a difference between a minimum brightness value in any one of brightness value ranges and the brightness value does not satisfy the fourth preset condition, the shutter speed corresponding to the brightness value range where the brightness value is located is determined as the shutter speed corresponding to the brightness value. The fourth preset condition comprises: a difference between a minimum brightness value in a brightness value range and the brightness value is greater than or equal to 0 and less than or equal to the fourth preset value.

In some embodiments, the third preset value and the fourth preset value are both smaller than a difference between a maximum brightness value and a minimum brightness value in any one of brightness value ranges.

In some embodiments, two adjacent brightness value ranges are continuous.

In some embodiments, a correspondence among brightness value, aperture value, and shutter speed includes brightness value, aperture value, and shutter speed satisfy the following formulas:

$$UseAv = 256 * \log 2(power(Fnum, 2)) \quad (1)$$

$$UseTv = 256 * \log 2(1/Shutter) \quad (2)$$

$$UseEv = UseAv + UseTv \quad (3)$$

Fnum represents aperture value. Shutter represents shutter speed. UseAv represents relative aperture value. UseTv represents relative shutter speed. UseEv represents brightness value.

In some embodiments, an imaging device further includes a memory (not shown). The memory is communicatively connected to the processor 602. The memory is used for program instructions. When the program instructions are called, the processor 602 executes the program instructions of the above solutions. Optionally, the memory may further store the correspondences described above.

Figure 7:
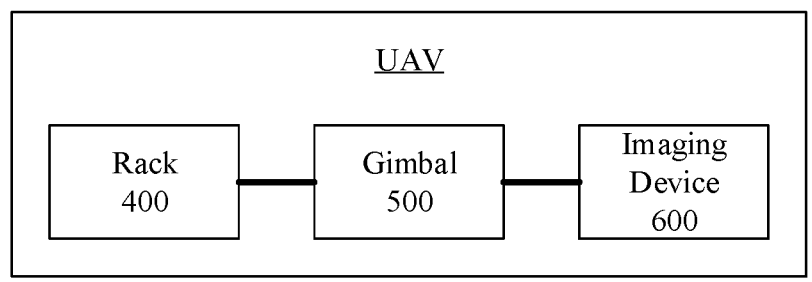
FIG. 7 illustrates a schematic diagram of an exemplary UAV consistent with various disclosed embodiments of the present disclosure.

FIG. 7 illustrates a schematic diagram of an exemplary UAV consistent with various disclosed embodiments of the present disclosure. As shown in FIG. 7, the UAV in one embodiment includes: a rack 400, a gimbal 500, and an imaging device 600. The gimbal 500 is mounted on the rack 400 and is used to carry the imaging device 600. The imaging device 600 may adopt the structure of the device shown in FIG. 6. Correspondingly, the technical solution of any of the method embodiments in FIG. 2 to FIG. 5 can be executed, and the implementation principles and technical effects are similar.

Those skilled in the art can understand that all or part of the steps for implementing the above method embodiments can be completed by a program instructing related hardware. The program described above can be stored in a computer-readable storage medium. When the program is executed, the steps included in the method embodiments described above are executed. The storage media described above include various media that can store program codes such as read-only memory (ROM), random access memory (RAM), magnetic disks or compact discs, and the like.

Finally, it should be noted that the above embodiments are only used to illustrate the technical solution of the present disclosure, and not to limit it. Although the present disclosure has been described in detail with reference to the above embodiments, those skilled in the art should understand that they can still modify the technical solutions described in the above embodiments, or equivalently replace some or all of its technical features. The modifications or replacements do not depart from the scope of the technical solutions of the embodiments of the present disclosure.

What is claimed is:

1. An imaging control method for an imaging device with an imaging lens, comprising:
   acquiring a brightness value of an environment in which an object-to-be-imaged is located;
   determining one of an aperture value and a shutter speed for the imaging lens according to the brightness value and one of a first correspondence between the brightness value and the aperture value and a second correspondence between the brightness value and the shutter speed;
   determining another one of the aperture value and the shutter speed for the imaging lens according to the brightness value, the determined one of the aperture value and the shutter speed, and a third correspondence among the brightness value, the aperture value, and the shutter speed; and
   implementing, according to the determined aperture value and the determined shutter speed, an imaging process on the object-to-be-imaged by the imaging device.

2. The method according to claim 1, wherein:
   the first correspondence comprises correspondences between N different brightness value ranges and N different aperture values, and N is an integer greater than 1; and
   according to the brightness value and the first correspondence between the brightness value and the aperture value, determining the aperture value corresponding to the brightness value, comprises:
      when the brightness value is in an increasing trend compared with a previous brightness value, if a difference between the brightness value and a maximum brightness value in one of brightness value ranges satisfies a first preset condition, determining the aperture value corresponding to the one of brightness value ranges as the aperture value corresponding to the brightness value, and if a difference between the brightness value and a maximum brightness value in any one of brightness value ranges does not satisfy the first preset condition, determining the aperture value corresponding to the brightness value range where the brightness value is located as the aperture value corresponding to the brightness value, wherein the brightness value is a current brightness value, the previous brightness value is a brightness value at one moment before a current time, and the first preset condition comprises: a difference between the brightness value and a maximum brightness value in a brightness value range is greater than or equal to 0 and less than or equal to a first preset value; and
      when the brightness value is in a decreasing trend compared with the previous brightness value, if a difference between a minimum brightness value in one of brightness value ranges and the brightness value satisfies a second preset condition, determining the aperture value corresponding to the one of brightness value ranges as the aperture value corresponding to the brightness value; and if a difference between a minimum brightness value in any one of brightness value ranges and the brightness value does not satisfy the second preset condition, determining the aperture value corresponding to the brightness value range where the brightness value is located as the aperture value corresponding to the brightness value, wherein the second preset condition comprises: a difference between a minimum brightness value in a brightness value range and the brightness value is greater than or equal to 0 and less than or equal to a second preset value.

3. The method according to claim 2, wherein the first preset value and the second preset value are both smaller than a difference between the maximum brightness value and the minimum brightness value in any one of brightness value ranges.

4. The method according to claim 2, wherein two adjacent brightness value ranges are continuous.

5. The method according to claim 1, wherein:
   the second correspondence comprises correspondences between M different brightness value ranges and M different shutter speeds, and M is an integer greater than 1; and
   according to the brightness value and the second correspondence between the brightness value and the shutter speed, determining the shutter speed corresponding to the brightness value, comprises:
      when the brightness value is in an increasing trend compared with a previous brightness value, if a difference between the brightness value and a maximum brightness value in one of brightness value ranges satisfies a third preset condition, determining the shutter speed corresponding to the one of brightness value ranges as the shutter speed corresponding to the brightness value, and if a difference between the brightness value and a maximum brightness value in any one of brightness value ranges does not satisfy the third preset condition, determining the shutter speed corresponding to the brightness value range where the brightness value is located as the shutter speed corresponding to the brightness value, wherein the brightness value is a current brightness value, the previous brightness value is a brightness value at one moment before a current time, and the third preset condition comprises: a difference between the brightness value and a maximum brightness value in a brightness value range is greater than or equal to 0 and less than or equal to a third preset value; and
      when the brightness value is in a decreasing trend compared with the previous brightness value, if a difference between a minimum brightness value in one of brightness value ranges and the brightness value satisfies a fourth preset condition, determining the shutter speed corresponding to the one of brightness value ranges as the shutter speed corresponding to the brightness value, and if a difference between a minimum brightness value in any one of brightness value ranges and the brightness value does not satisfy the fourth preset condition, determining the shutter speed corresponding to the brightness value range where the brightness value is located as the shutter speed corresponding to the brightness value, wherein the fourth preset condition comprises: a difference between a minimum brightness value in a brightness value range and the brightness value is greater than or equal to 0 and less than or equal to a fourth preset value.

6. The method according to claim 5, wherein the third preset value and the fourth preset value are both smaller than a difference between the maximum brightness value and the minimum brightness value in any one of brightness value ranges.

7. The method according to claim 5, wherein the third correspondence among the brightness value, the aperture value, and the shutter speed comprises:

$$UseAv=256*\log 2(power(Fnum,2)) \quad (1)$$

$$UseTv=256*\log 2(1/Shutter) \quad (2)$$

$$UseEv=UseAv+UseTv \quad (3)$$

wherein Fnum represents the aperture value, Shutter represents the shutter speed, UseAv represents a relative aperture value, UseTv represents a relative shutter speed, and UseEv represents the brightness value.

8. An imaging device, comprising:
an imaging lens;
an environment sensor for acquiring a brightness value of an environment in which an object-to-be-imaged is located; and
a processor configured to
    determine one of an aperture value and a shutter speed for the imaging lens according to the brightness value and one of a first correspondence between the brightness value and the aperture value and a second correspondence between the brightness value and the shutter speed; and
    determine another one of the aperture value and the shutter speed for the imaging lens according to the brightness value, the determined one of the aperture value and the shutter speed, and a third correspondence among the brightness value, the aperture value, and the shutter speed,
wherein the processor is communicatively connected with the environment sensor and the imaging lens.

9. The imaging device according to claim 8, wherein:
the first correspondence comprises correspondences between N different brightness value ranges and N different aperture values, and N is an integer greater than 1; and
the processor is configured to perform:
    when the brightness value is in an increasing trend compared with a previous brightness value, if a difference between the brightness value and a maximum brightness value in one of brightness value ranges satisfies a first preset condition, determining the aperture value corresponding to the one of brightness value ranges as the aperture value corresponding to the brightness value, and if a difference between the brightness value and a maximum brightness value in any one of brightness value ranges does not satisfy the first preset condition, determining the aperture value corresponding to the brightness value range where the brightness value is located as the aperture value corresponding to the brightness value, wherein the brightness value is a current brightness value, the previous brightness value is a brightness value at one moment before a current time, and the first preset condition comprises: a difference between the brightness value and a maximum brightness value in a brightness value range is greater than or equal to 0 and less than or equal to a first preset value; and
    when the brightness value is in a decreasing trend compared with the previous brightness value, if a difference between a minimum brightness value in one of brightness value ranges and the brightness value satisfies a second preset condition, determining the aperture value corresponding to the one of brightness value ranges as the aperture value corresponding to the brightness value, and if a difference between a minimum brightness value in any one of brightness value ranges and the brightness value does not satisfy the second preset condition, determining the aperture value corresponding to the brightness value range where the brightness value is located as the aperture value corresponding to the brightness value, wherein the second preset condition comprises: a difference between a minimum brightness value in a brightness value range and the brightness value is greater than or equal to 0 and less than or equal to a second preset value.

10. The imaging device according to claim 9, wherein the first preset value and the second preset value are both smaller than a difference between the maximum brightness value and the minimum brightness value in any one of brightness value ranges.

11. The imaging device according to claim 9, wherein two adjacent brightness value ranges are continuous.

12. The imaging device according to claim 8, wherein:
the second correspondence comprises correspondences between M different brightness value ranges and M different shutter speeds, M is an integer greater than 1; and
the processor is configured to perform:
    when the brightness value is in an increasing trend compared with a previous brightness value, if a difference between the brightness value and a maximum brightness value in one of brightness value ranges satisfies a third preset condition, determining the shutter speed corresponding to the one of brightness value ranges as the shutter speed corresponding to the brightness value, and if a difference between the brightness value and a maximum brightness value in any one of brightness value ranges does not satisfy the third preset condition, determining the shutter speed corresponding to the brightness value range where the brightness value is located as the shutter speed corresponding to the brightness value, wherein the brightness value is a current brightness value, the previous brightness value is a brightness value at one moment before a current time, and the third preset condition comprises: a difference between the brightness value and a maximum brightness value in a brightness value range is greater than or equal to 0 and less than or equal to a third preset value; and
    when the brightness value is in a decreasing trend compared with the previous brightness value, if a difference between a minimum brightness value in one of brightness value ranges and the brightness value satisfies a fourth preset condition, determining the shutter speed corresponding to the one of brightness value ranges as the shutter speed corresponding to the brightness value, and if a difference between a minimum brightness value in any one of brightness value ranges and the brightness value does not satisfy the fourth preset condition, determining the shutter speed corresponding to the brightness value range where the brightness value is located as the shutter speed corresponding to the brightness value, wherein the fourth preset condition comprises: a difference between a minimum brightness value in a brightness value range and the brightness value is greater than or equal to 0 and less than or equal to a fourth preset value.

13. The imaging device according to claim 12, wherein the third preset value and the fourth preset value are both smaller than a difference between the maximum brightness value and the minimum brightness value in any one of brightness value ranges.

14. The imaging device according to claim 8, wherein the third correspondence among the brightness value, the aperture value, and the shutter speed comprises:

$$UseAv = 256 * \log 2(power(Fnum, 2)) \quad (1)$$

$$UseTv = 256 * \log 2(1/Shutter) \quad (2)$$

$$UseEv = UseAv + UseTv \quad (3)$$

wherein Fnum represents the aperture value, Shutter represents the shutter speed, UseAv represents a relative aperture value, UseTv represents a relative shutter speed, and UseEv represents the brightness value.

15. An unmanned aerial vehicle, comprising: a rack, a gimbal, and an imaging device according to claim 8, wherein the gimbal is mounted on the rack, and the gimbal is configured to carry the imaging device.

* * * * *